Jan. 6, 1931.　　　　E. W. BREISCH　　　　1,787,813
TRICKLE CHARGE SYSTEM
Filed Sept. 2, 1926　　　　2 Sheets-Sheet 1

WITNESSES:　　　　　　　　　　　　　　　　INVENTOR.
Edgar W. Breisch.
BY
ATTORNEY

Jan. 6, 1931.  E. W. BREISCH  1,787,813
TRICKLE CHARGE SYSTEM
Filed Sept. 2, 1926   2 Sheets-Sheet 2

WITNESSES:
Wm. C. Groome.
O. B. Buchanan.

INVENTOR
Edgar W. Breisch.
BY
ATTORNEY

Patented Jan. 6, 1931

1,787,813

UNITED STATES PATENT OFFICE

EDGAR W. BREISCH, OF EDGEWOOD PARK, PENNSYLVANIA, ASSIGNOR TO WESTING-HOUSE ELECTRIC & MANUFACTURING COMPANY, A CORPORATION OF PENNSYLVANIA

TRICKLE-CHARGE SYSTEM

Application filed September 2, 1926. Serial No. 133,281.

My invention relates to battery-charging systems, and it has particular relation to "A" batteries for radio receiving sets which are charged at a slow rate by means of a "trickle" charger whenever the receiving set is not in use.

A disadvantage of the use of storage batteries for exciting the filament circuits of radio receiving sets, according to the practices of the prior art, has been that the duty of starting and stopping the charging operation at the proper times has been left to the attention of the operator, with the result that the storage battery has freqeuntly become very much run down before being charged, and, frequently, the charging current has been left on too long, resulting in an injurious overcharge.

The foregoing difficulties have been overcome by utilizing a single switch, as is common in radio receiving sets, for connecting or disconnecting the filament circuits thereof, said switch being provided, according to my invention, with back contacts so arranged that, whenever the receiving set is not in use, a charging circuit is energized for continuously charging the battery at a rate which is preferably low, as compared to the rate of discharge demanded by the receiving set. By the means just mentioned, it is assured that the "A" battery shall be completely charged and ready for use at all times, without any possibility of the operator forgetting to charge the battery, and without any possibility of the battery being overcharged at an injurious rate or of being left with the charging circuits connected to the battery while the filament circuits of the receiving set are simultaneously connected to the battery, which would result in a very objectionable hum in the receiving instruments.

A further object of my invention is to provide a radio power unit comprising an "A" battery and a charger therefor in a long narrow box adapted to be disposed with its narrow side toward the front so that it will fit into present battery compartments in radio sets and may also be placed on a table at the side of a radio set without taking up much frontage space on the table.

A further feature of my long narrow power unit is that the battery compartment is disposed at the front end of the unit, whereby the usual indicating device for indicating the condition of charge of the battery may be viewed from the front end of the unit, the charging equipment and controlling switch being disposed in a rear compartment, and means being provided at the front end of the unit for actuating said switch, the switch being adapted, in one position, to connect the load circuit to the battery, and, in the other position, to energize the charging unit.

With the foregoing and other objects in view, my invention consists in the methods and apparatus described and claimed in the following specification and illustrated in the accompanying drawing, wherein Figure 1 is a plan view of a trickle-charge unit made in accordance with my invention;

Figure 1:
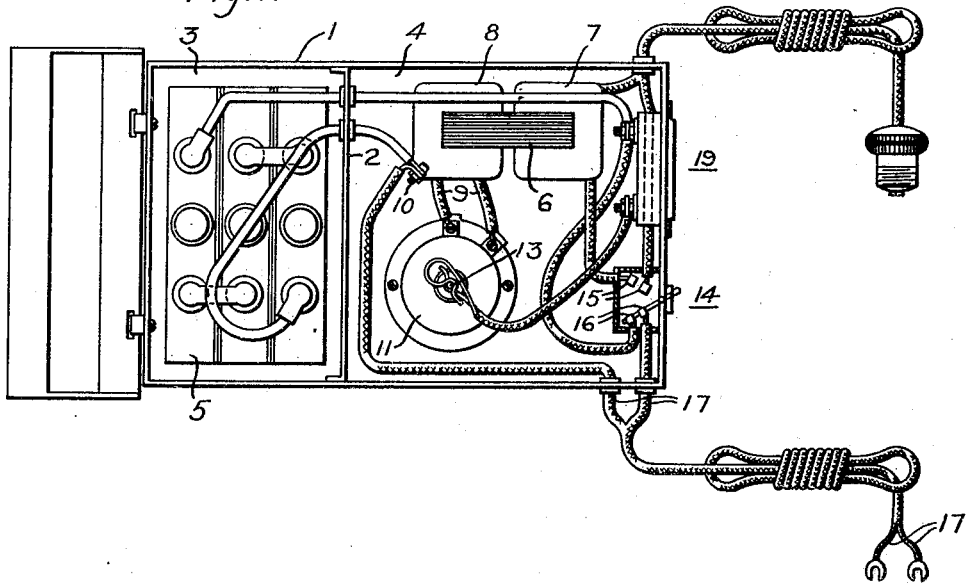

The embodiment of my invention shown in Fig. 1 comprises a box 1 having a partition 2 therein for providing a battery compartment 3 and a rectifier compartment 4. A storage battery 5 is disposed in the battery compartment. The rectifier compartment contains a transformer 6 having a primary winding 7 and a secondary winding 8, the latter being provided with filament-exciting terminals 9 and an additional terminal 10. A rectifier tube 11, having a filamentary cathode 12 and an anode 13, is also disposed in the rectifier compartment of the box, the filament 12 being energized by means of the leads 9 of the transformer secondary winding.

Figure 2:
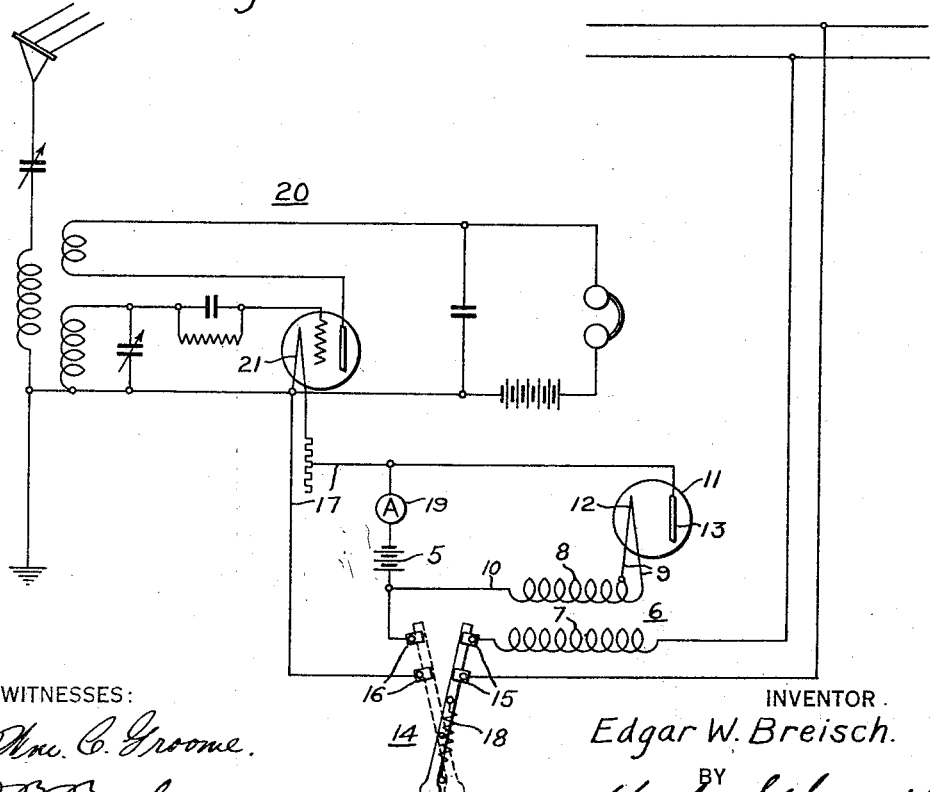
Fig. 2 is a diagrammatic view of circuits and apparatus showing the application of my invention to a conventional radio receiving set.

A double-throw snap switch 14 is disposed in one wall of the rectifier compartment 4 and is provided with contact terminals 15 on one side for completing the primary circuit connections of the transformer 6 and contact terminals 16 on the other side for connecting the battery 5 to the load circuit terminals 17. The double-throw switch 14 is, preferably, a snap switch provided with a coil spring 18, as shown in Fig. 2, or other means, for causing the switch to occupy either one of its two extreme positions, whereby either the primary circuit or the load circuit is energized at all times.

If desired, an ammeter 19 may be connected, in any desired manner, with the battery 5.

My apparatus is shown applied to a conventional vacuum-tube radio receiving set indicated, in its entirety, by the numeral 20, the load circuit 17 of the battery unit being utilized as a filament circuit for energizing a filament or filaments 21 of the vacuum tube or tubes embodied in the radio receiving set.

The embodiment of my invention which is shown in Fig. 1 does not include means for indicating the condition of charge or discharge of the storage battery.

Figure 3:
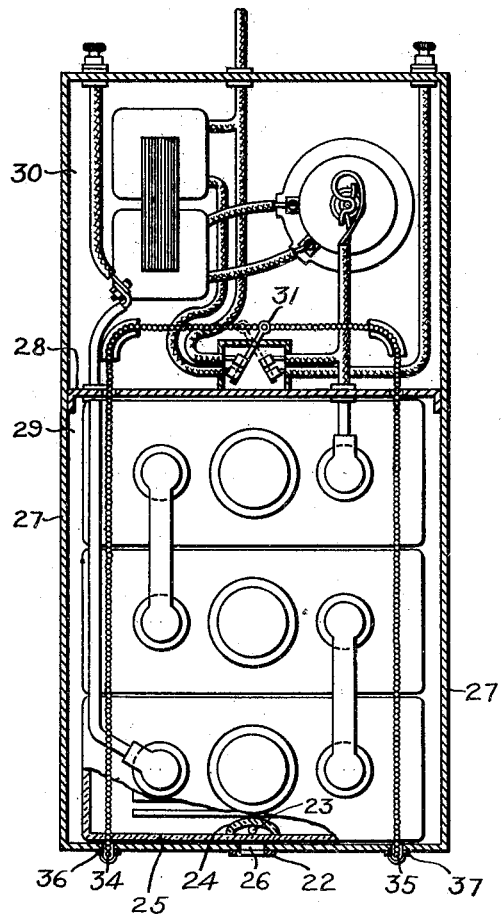
Fig. 3 is a plan view of a modified form of my invention including the battery indicating means and shown partially in section, approximately on the line III—III of Fig. 4.
Figure 4:
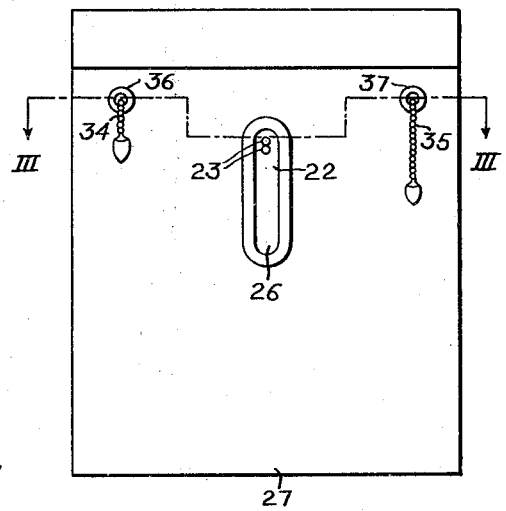
Fig. 4 is a front elevational view of the apparatus shown in Fig. 3.

The embodiment of my invention shown in Figs. 3 and 4 utilizes a conventional battery indicating means 22, such as is commonly supplied by the manufacturers of storage batteries, the same comprising a plurality of pith or wax balls 23, which may be of different colors and different specific gravities, disposed in the electrolyte of one of the storage-battery cells, being suitably restrained by means of a cage 24. The pith balls are visible through the glass wall 25 of the storage-battery cell and an opening 26 in the front end of the box 27 which encloses my power unit.

The power unit box 27 is provided with a partition 28 forming a front compartment 29 for the storage battery and a rear compartment 30 for the charging devices. The charging devices are similar to those shown and described in connection with Figs. 1 and 2 and comprise a snap switch 31 which is similar to the snap switch 14, previously described, and is mounted, in this instance, on the partition 28 of the rear or rectifier compartment 30.

Any suitable means may be utilized for actuating the snap switch 31 from the front end of the box 27. By way of illustration, I have indicated two chain terminals 34 and 35 extending through holes 36 and 37 in the front end of the box, whereby the switch 31 may be manually operated, as may be desired, in the manner just described.

It will be obvious that I have provided a unit wherein the small end of the box or container is presented to the front, and the condition of the battery is visible at the front end. At the same time, the switching mechanism, which must consequently be located back of the battery for lack of space at the front end of the box, is operable by remote control means which may be readily actuated from the front end of the box.

Various modifications may be made in the devices and systems embodying my invention without departing from the spirit and scope thereof, and I desire, therefore, that only such limitations shall be placed thereon as are imposed by the prior art and the appended claims.

I claim as my invention:

1. The combination with a storage battery, of a load circuit therefor, a charging circuit adapted to charge the battery at a relatively slow rate as compared to the rate of discharge demanded by said load circuit, and a snap switch so arranged as to connect said battery for either charging or discharging but never both charging and discharging and never neither charging nor discharging.

2. The combination with a storage battery, of a telephonic system comprising a load circuit for said battery, a charging circuit for said battery, and a snap switch so arranged as to connect said battery for either charging or discharging but never both charging and discharging and never neither charging nor discharging.

3. The combination with a storage battery, of a telephonic system adapted for intermittent service and comprising a load circuit for said battery, a charging circuit for said battery, and a switch whereby said load circuit may be connected or disconnected at will, said switch including means for causing it to assume one of only two stable positions, the connections being such that said load circuit is connected and said charging circuit is disconnected in one position of the switch and said load circuit is disconnected and said charging circuit is connected in the other position of the switch, thereby insuring that the battery shall be continuously charged whenever said telephonic system is not in service.

4. The combination with a storage battery, of a load circuit therefor adapted for intermittent service, a transformer having a primary circuit and a secondary circuit, a unidirectionally conducting rectifying device included in said secondary circuit, said secondary circuit also including said storage battery permanently connected thereto, and a switch in said load circuit for connecting and disconnecting the same to and from said storage battery, said switch including back contacts for closing said primary circuit when said load circuit is opened and opening said primary circuit when said load circuit is closed.

5. The combination with a storage battery, of a radio receiving set adapted for intermittent service and comprising a load circuit for said battery, a transformer having a primary circuit and a secondary circuit, a unidirectionally conducting rectifying device included in said secondary circuit, said secondary circuit also including said storage battery permanently connected thereto, and a double-throw snap switch one side of which is connected in said load circuit to open and close the same and the other side of which is connected in said primary circuit to open and close the same.

6. The combination with a radio receiving set having a hot-cathode circuit, of a storage battery for energizing said hot-cathode circuit, an alternating-current power circuit, a unidirectionally conducting rectifying device, a charging circuit including said unidirectionally conducting rectifying device associated with said power circuit for charging said battery, and a double-throw snap switch, one side of said switch being connected in said hot-cathode circuit of the receiver set to open and close the same, and the other side of said switch being connected in said alternating-current power circuit to open and close the same, whereby said power circuit is closed whenever the hot-cathode circuit of the receiver set is deenergized.

7. A battery and charger unit comprising a receptacle having a storage battery at its front end and a charging unit at its rear end, an indicating means associated with said battery and visable at the front end of said receptacle, load-circuit connections for drawing discharge current from said battery, and a switch in said load-circuit connections for opening and closing said circuit, said switch having back contacts for connecting and disconnecting said charging unit to and from said battery, and said switch being manually operable from the front of said receptacle.

8. A battery and charger unit comprising a box having a battery compartment at its front end and a rectifier compartment at its rear end, a storage battery in said battery compartment, and indicating means associated with said battery and visible at the front end of said box, load-circuit connections for drawing discharge current from said battery, a transformer in said rectifier compartment, said transformer having a primary circuit and a secondary circuit, a unidirectionally conducting rectifying device in said rectifier compartment, said secondary circuit permanently including said rectifying device and said storage battery, a double-throw snap switch in said rectifier compartment, one side of said switch being connected in said load-circuit connections for opening and closing the same, the other side of said switch being included in said primary circuit, and means manually operable from the front of said box for actuating said switch.

In testimony whereof, I have hereunto subscribed my name this 30th day of August, 1926.

EDGAR W. BREISCH.